United States Patent
Tuyls et al.

(10) Patent No.: US 8,699,714 B2
(45) Date of Patent: Apr. 15, 2014

(54) DISTRIBUTED PUF

(75) Inventors: Pim Theo Tuyls, Turnhout (BE); Geert Jan Schrijen, Venlo (NL); Daniel Willem Elisabeth Schobben, Waalre (NL)

(73) Assignee: Intrinsic ID B.V., Eindhoven (NL)

(*) Notice: Subject to any disclaimer, the term of this patent is extended or adjusted under 35 U.S.C. 154(b) by 125 days.

(21) Appl. No.: 13/129,462

(22) PCT Filed: Nov. 17, 2009

(86) PCT No.: PCT/EP2009/065303
§ 371 (c)(1),
(2), (4) Date: Aug. 5, 2011

(87) PCT Pub. No.: WO2010/055171
PCT Pub. Date: May 20, 2010

(65) Prior Publication Data
US 2011/0286599 A1    Nov. 24, 2011

(30) Foreign Application Priority Data
Nov. 17, 2008   (EP) .................................... 08169268

(51) Int. Cl.
*H04L 9/08*   (2006.01)
(52) U.S. Cl.
USPC ....................................................... 380/278
(58) Field of Classification Search
None
See application file for complete search history.

(56) References Cited

U.S. PATENT DOCUMENTS

| 7,107,567 B1 | 9/2006 | LeBlanc |
| 2004/0015644 A1 | 1/2004 | Gammel et al. |
| 2008/0059809 A1* | 3/2008 | Van Dijk ........................ 713/190 |
| 2010/0122353 A1* | 5/2010 | Koushanfar et al. ............ 726/33 |

FOREIGN PATENT DOCUMENTS

| CA | 2 350 029 | 12/2002 |
| WO | WO 2005/091550 | 9/2005 |

OTHER PUBLICATIONS

International Search Report for PCT/EP2009/065303, mailed Apr. 21, 2010.
Written Opinion of the International Searching Authority for PCT/EP2009/065303, mailed Apr. 21, 2010.
Bosch, C. et al., "Efficient Helper Data Key Extractor on FPGAs", Cryptographic Hardware and Embedded Systems A Ches, (2008), pp. 181-197.

* cited by examiner

*Primary Examiner* — Brandon Hoffman
(74) *Attorney, Agent, or Firm* — Nixon & Vanderhye P.C.

(57) ABSTRACT

An electronic system (100) having a memory (1 12, 1 14, 1 16) with multiple memory locations, each specific memory location of the multiple memory locations being arranged to produce a respective value, the respective value depending on a physical, at least partially random, configuration of components constructing the specific memory location, the electronic system comprises a key extraction means (130) arranged to retrieve multiple values in a first order from the multiple memory locations and for determining a reproducible cryptographic key in dependency on the multiple values, characterized in that the electronic system further comprises a re-ordering (120) means in between the memory and the key extraction means for providing the multiple values to the key extraction means in a second order, different from the first order, prior to determining the cryptographic key.

22 Claims, 1 Drawing Sheet

DISTRIBUTED PUF

This application is the U.S. national phase of International Application No. PCT/EP2009/065303 filed 17 Nov. 2009, which designated the U.S. and claims priority to EP Application No. 08169268.3 filed 17 Nov. 2008, the entire contents of each of which are hereby incorporated by reference.

FIELD OF THE INVENTION

The invention relates to an electronic system having a memory with multiple memory locations, each specific memory location of the multiple memory locations is arranged to produce a respective value, the respective value depending on a physical, at least partially random, configuration of components constructing the specific memory location, the electronic system comprises a key extraction means arranged to retrieve the multiple memory locations to obtain multiple values and for determining a reproducible cryptographic key in dependency on the multiple values.

BACKGROUND OF THE INVENTION

A Physical Uncloneable Function (PUF) is a function which is embodied as a physical system, in such a way that an output of the function for an input is obtained by offering the input to the physical system in the form of a stimulus, and mapping the behavior that occurs as a result of an interaction between the stimulus and the physical system to an output. Wherein the interaction is unpredictable and depends on essentially random elements in the physical system, to such an extent, that it is unfeasible to obtain the output, without having had physical access to the physical system, and that it is unfeasible to reproduce the physical system. Preferably, a PUF is also easy to evaluate. For practical uses, PUFs are preferably low in manufacture costs.

Conventionally, an input or stimulus that a PUF accepts is called a 'challenge'. The output of a PUF, that is, the behavior the PUF exhibits after interaction with the stimulus, is called a 'response'. A pair comprising a challenge and the corresponding response of a PUF is called a challenge-response pair. Some types of PUFs allow a wide range of different inputs, some types allow a more limited range of inputs, or may even allow only a single input. It would be most preferable, if a PUF when evaluated multiple times for the same challenge would produce multiple responses which are all equal. This property is not necessary though, and, in practice, most PUFs do not posses it. As long as the multiple responses lie sufficiently close to each other, the PUF can be usefully applied.

Since the interaction between a stimulus and the physical system cannot be predicted without access to the system, the PUF is hard to characterize and to model. The output of a particular PUF for an input can therefore only be obtained using the particular physical system underlying the particular PUF. Possession of a challenge-response pair is proof that at some point the challenge was offered to the unique physical system that underlies the PUF. Because of this property, i.e., the property that challenge-response pairs are coupled to a unique physical device, a PUF is called uncloneable. By equipping a device with a PUF, the device also becomes uncloneable.

Physical systems that are produced by a production process that is, at least in part, uncontrollable, i.e., a production process which will inevitably introduce some randomness, turn out to be good candidates for PUFs.

One advantage of PUFs is that they inherently possess tamper resistant qualities: disassembling the PUF to observe its working, will also disturb the random elements and therefore also disturb the way inputs are mapped to outputs.

One way of constructing a PUF uses a static random access memory (SRAM); these PUFs are called SRAM PUFs. SRAMs have the property that after they are powered-up, they are filled with a random pattern of on-bits and off-bits. Although the pattern will not repeat itself exactly if the SRAM is powered-up a next time, the differences between two such patterns is typically much smaller than half the number of bits in the state.

A second kind of S-RAM PUFs is constructed with Dual Port RAM. By writing at the same time different information on both ports, the memory cell is brought into an undefined state which shows a PUF-like behavior.

One application of PUFs is to derive a cryptographic key on an electronic circuit. The electronic circuit typically includes an integrated Circuit (IC) and/or programmable logic. The programmable logic comprises, e.g., a field-programmable gate array (FPGA), a programmable logic device (PLD), or a digital signal processor (DSP), a microprocessor, etc. Instead of storing the cryptographic key in a non-volatile memory of some kind, the key is generated from the PUF only when the key is needed by the device. The key can be deleted when it is no longer needed. The next time the key is needed, it can be derived again from the PUF. Since the PUF may not give the exact same result when the same challenge is evaluated twice, a so-called Helper Data algorithm, also known as a Fuzzy Extractor, may be used to ensure that the key will be the same, each time it is derived. One way of using helper data to construct reproducible values from noisy measurements is described, e.g., in international patent application WO 2006/129242, "Template Renewal in Helper Data Systems", etc.

One way to use a PUF to create a cryptographic key is as follow. First, during an enrollment phase, a challenge-response pair is created. Then, using the fuzzy extractor, helper data is created. On the device the challenge and the helper data are stored in a non-volatile memory. To derive the cryptographic key, a new response is obtained by evaluating the PUF for the challenge again. By combining the new response with the stored helper data, according to a helper data algorithm, a key is derived. The helper data ensures that the key is the same, each time it is derived.

Without a PUF, the cryptographic key may be recovered by an attacker, by mounting a physical attack on the non-volatile memory. For example, the attacker may open the memory and probe its content. Using a PUF makes this type of attack much harder, since opening the PUF will typically disturb the precise way in which the PUF interacts with inputs. Accordingly, information the attacker learns from his probe is not related to the interaction which was used to create the cryptographic key. This makes it harder for an attacker to find the key using a physical attack.

PUFs based on the intrinsic behavior of memory cells have the disadvantage that memory modules (especially SRAM) are typically relatively large structures that can easily be identified in an integrated circuit. An attacker, who manages to open the IC and tap the data lines to the memory without disturbing the memory itself, could obtain useful information once the IC is running and the PUF is challenged. Together with the helper data, the probed data may enable him to find the secret key back.

It is a problem of the prior art that a memory based PUF is susceptible to an attack on its data line.

SUMMARY OF THE INVENTION

It is an object of the invention to increase the resistance of a memory based PUF to physical attacks.

This and other objects are achieved by the electronic system according to the invention.

An electronic system having a memory with multiple memory locations, each specific memory location of the multiple memory locations is arranged to produce a respective value, the respective value depending on a physical, at least partially random, configuration of components constructing the specific memory location, the electronic system comprises a key extraction means arranged to retrieve in a first order from the multiple memory locations to obtain multiple values and for determining a reproducible cryptographic key in dependency on the multiple values, characterized in that the electronic system further comprises a re-ordering means for arranging the multiple values into a second order, different from the first order, prior to determining the cryptographic key.

An attacker who whishes to recover the cryptographic key by mounting a physical attack on the electronic system would preferably attack the memory. Memories are relatively large structures therefore, compared to other electronic structures relatively easy to find. However the multiple values that are produced by the memory depend on the physical configuration of the components constructing the memory. By mounting a physical attack on the memory the physical configuration is disturbed, and the values are likely changed. The attacker may also attempt to mount the physical attack on the means through which the key extraction means has access to the multiple values, i.e. on data-lines. Although the attacker may find some of the multiple values, the re-ordering changes the order of the multiple values. As the multiple values depend at least partially on a random configuration, the multiple values do not have an inherent structure for reconstructing the correct ordering of the multiple values. The re-ordering means and key-extracting themselves are less vulnerable against physical attacks than the memory and the data lines are, for at least two reasons. First these components comprise mostly combinatorial logic, which can be made much smaller than a memory or a data line. Second, as the function of these blocks is more complicated, their layout can be made less regular, this makes it harder to find a convenient place to probe and attack them. Since the memory and/or data lines are protected against physical attacks, the resistance of the memory based PUF against physical attacks has increased.

In a preferred embodiment, the memory comprises multiple separate memory blocks, and wherein the multiple memory locations are distributed over all the multiple memory blocks.

The cryptographic key is derived from a combination of data read from the multiple memories, so to obtain enough information to recover the cryptographic key, an attacker needs to tap multiple memories. Since the multiple memories are distributed in location over the IC, there are multiple different locations where an attacker would need to apply a probe. Therefore the effort the attacker would need to spend for recovering the cryptographic key has increased. Moreover, the likelihood that an attacker will damage a memory while applying a probe has increased, since the number of probes has increased. If a memory is damaged, the information that an attacker learns from a probe for that memory becomes less useful as the specific value produced by that memory depends on the physical configuration of that memory. After the physical configuration has changed as a result of the damage the value it can produce may also change.

Since probing attacks are more difficult, the resistance of the memory based PUF against physical attacks has increased.

In a preferred embodiment, the electronic system comprises an inversion means for writing to each of the specific memory locations an inverse of the specific value and inversion determination means for determining if the multiple memory locations store the inverse of the multiple values.

In a preferred embodiment, the memory is also arranged for writing to. The electronic system comprises an inversion means for writing to each of the specific memory locations an inverse of the specific value and inversion determination means for determining if the multiple memory locations store the inverse of the multiple values.

It is undesirable to challenge a memory based PUF twice, since this requires power-down and power-up, which is not convenient during operation. In order to keep access to the cryptographic key, it must be kept in a memory since the PUF cannot be re-challenged. This is undesired for a number of reasons; the stored key will occupy memory that can not be used by other applications, and moreover the memory in which the key is stored may itself be vulnerable to physical attack. Furthermore, in order to prevent ageing of the memory, i.e., the gradual changing of the multiple values as a result of using the electronic system multiple times, one can not use the memory to store the multiple values. Storing in a memory, in particular an SRAM memory, the multiple values at the memory locations that were used to extract the multiple values from, will accelerate the ageing. To mitigate the ageing the inverse of the multiple values must be stored in the memory locations.

As the invention provides an inversion determination means, the electronic system can determine if the content of the memories are the multiple values or, if the inverse of the multiple values have been written. In case the inverse of the multiple values are present in the memory, the key extractor first inverts the values read from the memory. Accordingly, when the cryptographic key is needed, the key extractor can use the content of the memory, without the need of a power-up and power-down cycle.

The inversion determination means further allows so-called hot starts of the electronic system. In a hot start, the electronic system goes to its initial state, without the memories powering-down. If the memories do not power down, their content does not change. Since the electronic system does not have the multiple values in the memory, but the inverted multiple values, due to the ageing countermeasure, the electronic system cannot go through a regular power-up routine. However, by employing the inversion determination means during the power-up routine, the routine can determine if the memory stores the multiple values or the inverse of the multiple values. In the latter case, the key extracting means is configured to first invert before determining the cryptographic key.

It is noted that an inversion determination means is of itself of particular advantage, in any electronic system employing a memory based PUF. In particular, the inversion determination means may also be used with the electronic system according to the invention, without the re-ordering means. The advantages of the inversion determination means, as described here, are retained with the re-ordering means.

BRIEF DESCRIPTION OF THE DRAWINGS

The invention is explained in further detail by way of example and with reference to the accompanying drawings, wherein.

Throughout the Figures, similar or corresponding features are indicated by same reference numerals.

LIST OF REFERENCE NUMERALS

| | |
|---|---|
| 100 | an electronic system |
| 112, 114, 116 | a memory |
| 120 | an address decoder |
| 130 | a key extractor |
| 140 | a crypto engine |
| 150 | a helper data constructor |
| 160 | a helper data memory |
| ADB0, ADB1, ADB2, ADB3 | a bus |

DETAILED EMBODIMENTS

In the remainder, a description is given of four main inventions relating to PUFs. The inventions can be used together but may also be used independent of each other in combination with other techniques.

In summary, the main inventions are:

1. Re-Ordering.

Using a reordering means makes tapping data lines to memory used as a PUF less useful for an attacker. Although values relating to memory locations may be obtained by the attacker, the information at which point the obtained value will be used in determining the cryptographic key is obscured from the attacker. This makes recovering the key much harder.

2. Using Multiple Memories.

Using multiple memories forces an attacker to tap multiple memories. Tapping multiple memories increases the effort for an attacker. Moreover, the attacker runs a higher chance of damaging the electronic system.

An embodiment is as follows: An electronic system having a memory with multiple memory locations wherein the memory comprises multiple separate memory blocks, and wherein the multiple memory locations are distributed over all the multiple memory blocks, each specific memory location of the multiple memory locations is arranged to produce a respective value, the respective value depending on a physical, at least partially random, configuration of components constructing the specific memory location, the electronic system comprises a key extraction means arranged to retrieve the multiple memory locations to obtain multiple values and for determining a reproducible cryptographic key in dependency on the multiple values.

3. A Construction Signaling Means for Signaling if the Helper Data has been Created.

When helper data is created on-line, i.e. created on the same device where the key extraction will later take place, it is a problem to distinguish the content of a helper data memory before it is filled with helper data with the situation after the helper data memory is filled with helper data.

An embodiment is as follows: An electronic system having a memory with multiple memory locations, each specific memory location of the multiple memory locations is arranged to produce a respective value, the respective value depending on a physical, at least partially random, configuration of components constructing the specific memory location, the electronic system comprises a key extraction means arranged to retrieve the multiple memory locations to obtain multiple values and for determining a reproducible cryptographic key in dependency on the multiple values, the electronic system comprises a helper data construction means, the helper data construction means being arranged to produce helper data in dependency on the multiple values and to store the helper data in helper data memory, and wherein the key extraction means is arranged to apply an error correcting procedure on the multiple values in dependency on the helper data for making the cryptographic key reproducible, and wherein the electronic system comprises a construction signaling means for signaling if the helper data has been created.

4. An Inversion Determination Means for Determining if the Multiple Memory Locations Store the Inverse of the Multiple Values.

It is a problem if the reproducible cryptographic key is needed more than once in the system. If the reproducible cryptographic key is, during operation, stored in a memory, then that memory becomes a target for physical attack. On the other hand, re-challenging a PUF memory needs a power-down, power-up cycle, which is undesirable. Moreover, anti-ageing measures interfere with re-reading from the memory. This problem is solved by having an inversion determination means, which allows determining and/or detecting if the inverse of the multiple values have been written to the multiple memory locations.

An embodiment is as follows: An electronic system having a memory with multiple memory locations, each specific memory location of the multiple memory locations is arranged to produce a respective value, the respective value depending on a physical, at least partially random, configuration of components constructing the specific memory location, the electronic system comprises a key extraction means arranged to retrieve the multiple memory locations to obtain multiple values and for determining a reproducible cryptographic key in dependency on the multiple values, wherein the memory is arranged for writing to, and wherein the electronic system comprises an inversion means for writing to each of the specific memory locations an inverse of the specific value and an inversion determination means for determining if the multiple memory locations store the inverse of the multiple values.

While these inventions are susceptible of embodiment in many different forms, there is shown in the drawings and will herein be described in detail one or more specific embodiments, with the understanding that the present disclosure is to be considered as exemplary of the principles of the invention and not intended to limit the invention to the specific embodiments shown and described.

Figure 1:
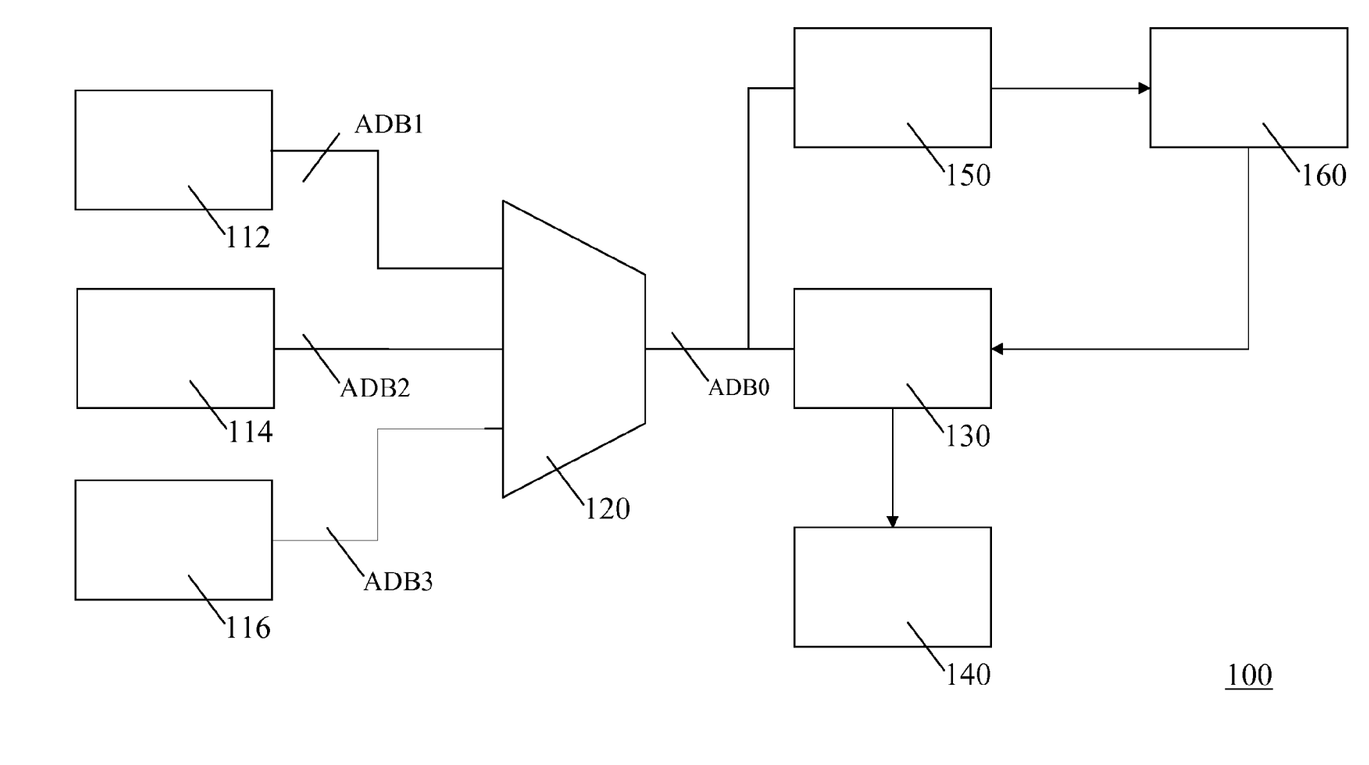
FIG. 1 is a block diagram illustrating a first embodiment of the electronic system according to the invention.

In FIG. 1 an electronic system 100 is illustrated. Electronic system 100 preferably comprises multiple memories. Electronic system 100 may also comprise a single memory, preferably only a part of the single memory is used to produce the multiple values. In the FIGURE three memories are illustrated: a memory 112, a memory 114 and a memory 116. The number of memories used, i.e., the number of separate memory blocks, is essentially arbitrary. Memories 112, 114 and 116, together comprise multiple memory locations. Each of the memories comprises at least one memory location, and may comprise multiple memory locations. Using more separate memories will increase the security, since it increases the number of points where an attacker needs to probe a data line. Using more separate memories also further obfuscates the location of memory locations used to construct the cryptographic key. By distributing the multiple memory cells over an integrated circuit, it is more difficult for an attacker to localize from where the PUF data is generated.

Memories 112, 114 and 116 are preferably SRAM memories, but other memories, in particular volatile memories, are possible too. When a memory location, in such a memory is read out, at some point after powering-up electronic system 100, and before the memory location is written to, the value read from the memory location is undefined. For example, if the memory location is of bit-size, the read value may both be 1 and 0. However, small deviations in the components which construct the memory location cause one of the values to be more likely than the other. The deviations were introduced by chance during manufacture of the memory. In this sense the memory locations have PUF like behavior. When all memory locations are read out in this way, multiple values are obtained. If a value is read out again, after the memory is powered down and up, the new value is often the same as the old value, however, this is not necessary. Likely, when the multiple values are all re-read, many of them will have acquired a new value.

A second kind of memory based PUFs may be comprise Dual Port RAM. A memory cell of the Dual Port RAM is brought into an undefined state, by writing different information on both ports at the same time. The results produced by the memory cell as a result of the writing on both ports, shows a PUF-like behavior.

Other examples, of volatile memory elements showing PUF behavior are a flip-flop and a latch. At start up, a flip-flop, such as may be included in an integrated circuit, will be filled with a random value. The random value depends on the precise way the flip-flop is constructed. A slight alteration in the configuration of the various components that construct the flip-flop may alter the random value.

Different types of memory may be combined. For example, memory 112 may be an SRAM and memory 114 may be one or more flip-flops. This gives an advantage, in case, in the future an attack is discovered which is aimed at a particular type of memory.

A memory based PUF may also be constructed from a Field-programmable gate array (FPGA), for example by simulation one or more SRAM memory cells. Other useable PUFs include, so-called intrinsic PUFs which are based on delay phenomena. Details of a delay PUF can be found in US patent application US20030204743. Details of a butterfly PUF can be found in international patent application with number IB2008/053299.

The electronic system 100 may comprise a number of memories which each comprise only a small number of memory locations, e.g., a single flip-flop. Many small numbers of memory locations are possible, e.g., 1, 2, 4 or 8, or any small power of 2, or any small number. In an embodiment all the memory locations are distributed over such small memories. In an embodiment all the memory locations are distributed over memories, which each have only a single memory location.

Electronic system 100 further comprises a key extractor 130, also known as a fuzzy extractor. Preferably electronic system 100 also comprises a helper data constructor 150 and a helper data memory 160. The key extractor 130 is arranged to read the memory locations, and may to that end be connected to memories 112, 114 and 116, preferably through an address decoder 120. Key extractor 130 may also be connected to helper data memory 160, from which key extractor 130 can receive helper data. Helper data constructor 150 is arranged to produce helper data, to that end helper data constructor 150 also has access to memories 112, 114 and 116, preferably also through address decoder 120. Helper data constructor 150 is preferably connected to helper data memory 160 for storing helper data that helper data constructor 150 created.

If address decoder 120 is used with multiple separate memory blocks, such as memories 112, 114 and 116 then, preferably, address decoder 120 permutes the multiple locations in the multiple separate memory blocks into a second order, which permutes the multiple values across all the separate memory blocks. For example, address decoder 120 may map a next one in a number of sequential memory address used by key extractor 130, to a next one of the separate memory blocks.

Helper data memory 160 may comprise any type of non-volatile memory, however, for additional security the memory may be a One Time Programmable (OTP) memory, which can be written only once. An OTP memory gives the additional advantage that an attacker cannot modify the contents of the helper data memory, after the enrollment phase has finished.

For example, memory 112 is connected with address decoder 120 using an address and/or data bus, indicated in the FIGURE as bus ADB1. Memory 114 may be connected with address decoder 120 using an address and/or data bus ADB2. Memory 116 may be connected with address decoder 120 using an address and/or data bus ADB3. Key extractor 130 may be connected to address decoder 120 via an address and/or data bus ADB0.

The re-ordering means can arrange the multiple values in a second order in several ways. For example, address decoder 120 can change the address that it receives, in this way address decoder 120 causes a reading of the multiple values in a first order to arrive at the memory in a second order. Preferably, the second order is distributed over the multiple memory blocks. Alternatively, address decoder 120 can permute the multiple values after they are retrieved but before key extractor 130 determines the cryptographic key.

Key extractor 130 and helper data constructor 150 may access a memory location by sending a read request for the memory location to address decoder 120, e.g. over bus ADB0. The memory locations in memories 112, 114 and 116 are associated by address decoder 120 with addresses used on bus ADB0. Each read request of key extractor 130 and/or helper data constructor 150 comprises such an address. If address decoder 120, which is comprised in electronic system 100, receives a read request, it takes the address and determines in which memory the associated memory location is located, address decoder 120 can then forward the read request to the correct memory. Preferably, address decoder 120 also translates the address to a local address used in the memory. In an embodiment, address decoder 120 can apply any mapping between addresses used in helper data constructor 150 and/or key extractor 130 and the memory locations. For example, address decoder 120 may use a look-up table to translate address to local address, or address decoder 120 may use a symmetric block cipher, or a permutation for the mapping, etc.

Key extractor 130 is arranged to determine a cryptographic key in dependency on the multiple values, which key extractor 130 reads from the multiple locations and from the helper data, which key extractor 130 reads from helper data memory 160. Since key extractor 130s read through address decoder 120, the multiple values are re-ordered prior to determining the cryptographic key.

The cryptographic key can be used for various cryptographic applications, which in itself is known, in the art of application of cryptographic keys. For example, electronic system 100 may comprise a crypto engine 140, which takes the cryptographic key as input. For example, crypto engine 140 may use the key to authenticate itself to a third party using a Message Authentication Code (MAC). The MAC is attached to a message which is transmitted to some place (not shown) outside electronic system 100.

Preferably, some or all components of electronic system 100 are combined in an integrated circuit. It is particularly advantageous to combine: the memory (e.g. memory 112, memory 114, memory 116), address decoder 120, key extractor 130, crypto engine 140 and helper data constructor 150 in a single IC. The advantage is that these components all have access to information which may compromise the cryptographic key. It is known that only access to helper data memory 160 will not compromise the cryptographic key, hence helper data memory 160 need not be integrated in the IC. However it is to further advantage to integrate also helper data memory 160 in the IC. The further advantage is that, even if, at least partial, knowledge of secret information contained in the memory locations is obtained, an attacker needs also to recover the helper data stored in helper data memory 160 to make use of the secret information. This further increases the difficulty of an attack. Helper data memory 160 may also be comprised in helper data constructor 150. Preferably, the multiple separate memory blocks are distributed across the integrated circuit.

During operational use, after electronic system 100 is powered up, helper data constructor 150 will determine if helper data has been constructed. For example, in one embodiment, helper data constructor 150 can consult a construction signaling flag (not shown). The construction signaling flag comprises, e.g., a flip-flop, or a non-volatile memory, e.g. a flash memory. One state of the flip-flop indicates to helper data constructor 150 that helper data has already been created, and another state indicates that is was not. In a second embodiment helper data constructor 150 consults helper data memory 160 to verify if helper data memory 160 stores a construction string. Helper data constructor 150 may scan all, or most, or selected parts, of helper data memory 160 to look for the construction string. Helper data constructor 150 may also look at a specific pre-determined place in helper data memory 160 for the construction string. The construction string could be any arbitrary but fixed, pre-determined string. Helper data constructor 150 may also be a signature computed over the helper data, after the helper data is created.

Using a construction string has the advantage that an uninitialized helper data memory 160 may be used. If helper data memory 160 at first comprises random data, then it may not be possible to discern the random data from helper data. However, by writing a construction sting, of sufficient length, e.g. a string of one hundred zero bits, or some number of random but fixed bits, it can be indicated that the helper data memory 160 has been filled with helper data.

If helper data constructor 150 determines that the helper data is not created, then helper data constructor 150 will proceed with constructing helper data. Various ways for constructing helper data are known, here a specific example is given, but in essence any helper data construction scheme may be combined with the method according to the invention. Helper data constructor 150 reads the multiple values from the multiple locations, by sending a series of read requests for a sequential series of read request addresses to address decoder 120. Address decoder 120 may arrange the multiple values in the second order. Next helper data constructor 150 selects one or more code words from an error correcting code. For example, helper data constructor 150 may select the code words randomly. Preferably, helper data constructor 150 selects code words such that the total length of the code words is at least as long as the length of the multiple values. Preferably, the length is measured in digits, e.g., in bits. Next, helper data constructor 150 performs an exclusive-or operation on a concatenation of the code words and a concatenation of the multiple bits. For example, helper data constructor 150 may use a repetition code. Many other error correcting codes may be used to construct helper data, for example, BCH codes, Reed-Muller codes, Golay codes, Reed-Solomon codes, LDPC codes, etc. Furthermore, it is possible to use multiple levels of coding, e.g., by combining or concatenating different codes. The helper data comprises the result of the exclusive- or operation and is written to helper data memory 160. Helper data memory 160 is preferably non-volatile memory, e.g., an EEPROM, or a flash memory, etc.

Alternative ways of constructing helper data, which do not need an exclusive-or operation, exist. For example, helper data constructor 150 may select a random code word from a suitable error correcting code. Next, for each respective element in the code word, e.g., for each bit in the code word, the helper data constructor 150 selects a respective random element in the memory, e.g. memories 112, 114, 116, which produced the respective element in the multiple values. A respective pointer to the respective random element in the memory is recorded in the helper data, e.g. stored in helper data memory 160. This construction can be used with a re-ordering means, e.g. address decoder 120, and without. If address decoder 120 is used the pointers may be re-ordered by it.

Helper data constructor 150 may be off-line, i.e., not permanently connected to the system in which key extractor 130 is present. For example, an embodiment may comprise a memory, e.g. memories 112, 114, 116, a key extractor 130 and a helper data memory 160, for example, in a smart card, or an RFID. During an enrollment phase, the multiple values are presented to a server which computes the helper data. The computed helper data is then stored in the helper data memory. This has the advantage that the embodiment, e.g. the smart card, comprises less circuitry, and is therefore less complicated and less expensive to manufacture. Having the helper data constructor 150 included with key extractor 130 has the advantage that no external copy of secret data, such as the multiple values and/or the cryptographic key, exists, e.g., on a server. Accordingly, the secret data cannot be compromised by an attack on the server, etc.

If helper data constructor 150 determines that the helper data has been created, then key extractor 130 may proceed with determining a cryptographic key. Preferably, key extractor 130 first determines if inverted values have been written to the memory, as is explained below. If key extractor 130 does not so determine, then key extractor 130 retrieves, preferably in the first order, values form the multiple locations. Preferably address decoder 120 arranges the multiple values in the second order, as explained above. Various ways of determining a cryptographic key, using a PUF, are possible. Here a specific example is given, but other ways of determining a reproducible cryptographic key from PUF data can be used with the invention. Key extractor 130 may retrieve from helper data memory 160 the helper data and apply it to the read multiple values in a manner compatible with construction used by helper data constructor 150. For example, key extractor 130 may perform an exclusive or between the read multiple values and the helper data. Alternatively, key extractor 130 may resolve a list of pointers stored in helper data memory 160. Key extractor 130 may apply an error correcting step to the result of applying the helper data. The error correcting step will correspond to the code, from which helper data constructor 150 selected the code word.

Key extractor 130 may use the error corrected result directly as a key, but preferably key extractor 130 will perform a post-processing step. For example, key extractor 130 may perform a cryptographic hash operation on the error corrected result. The result is the cryptographic key. The memory, which is here used as a PUF, may give the exact same result upon multiple reads. However, any value produced by the PUF which is different from the value produced when the helper data was produced, will be regarded as an error by the error correcting code. An error correcting code is capable of correcting such errors, as is known in the art of error correcting codes.

After key extractor 130 has determined the reproducible cryptographic key, it can optionally perform an anti-ageing countermeasure. For example, key extractor 130 may write an inversion of the multiple values back to memory, in the first order. If an address decoder 120 is used, then the same mapping applied to reading the multiple values should be applied to writing the inverted multiple values. This measure will prolong the time that the memory is useable as a PUF.

If electronic system 100 has received a hot-start, for example, if electronic system 100 starts its start-up routine, without intermediately powering down the memory, e.g., memories 112, 114 and 116. It may happen that key extractor 130 needs to determine the key, yet the memory will not react as a PUF since values were written to it. However this problem can be solved using an inversion determination means for determining if the multiple memory locations store the inverse of the multiple values. Preferably, the inversion determination means is arranged for determining the inversion after a re-starting, i.e. re-booting, of the electronic system.

For example, electronic system 100 may comprise an inversion signaling flag (not shown in FIG. 1) for signaling that the multiple memory locations store the inverses of the multiple values. After key extractor 130 writes the inverted multiple values to the memories, key extractor 130 may also set the inversion signaling flag to a state which indicates that the inverted multiple values have been written. Electronic system 100 may also comprise a resetting means for resetting the inversion signaling flag to a state which indicates that the inverted multiple values have not been written. The resetting means may trigger upon a cold restart. For example, the resetting means may detect that the memory, e.g. one or more of the memories 112, 114 and 116, is powered down, and thereupon reset the inversion signaling flag.

Preferably, the inversion signaling flag comprises a signal memory which is in a fixed state after power up. After the inverses are written a new state is written to the signal memory. When a hot restart is done, memories are not powered-down, also the signal memory is not powered-down. In this case the signal memory correctly indicates the inversion state of the memory. However, when a cold restart is done, the signal memory was powered-down and has consequently automatically reverted to the fixed state.

In another embodiment an inversion signaling flag need not be used. In this embodiment, helper data constructor 150 produces in conjunction with producing the helper data a helper data verification string. The helper data verification string indicates the correctness of the reproducible cryptographic key. For example, helper data constructor 150 may, possibly using key extractor 130, compute a cryptographic hash of the reproducible key. Helper data constructor 150 may also compute a MAC over the reproducible cryptographic key as the verification string. The verification string is preferably stored in a memory to which key extractor 130 has access, for example, helper data memory 160.

When later key extractor 130 starts to determine the reproducible cryptographic key, for example using the method outlined above, it may determine using the verification string if this determination was successful. For example, if the memories contain the inverted multiple values, then typically, an unaltered key determination will not succeed. Key extractor 130 can, for example, compute the hash of the cryptographic key that it produced, and compare it to the hash stored in helper data memory 160. Similarly, key extractor 130 may compute the MAC over the cryptographic key that it produced and compare it to the MAC stored in helper data memory 160. When a discrepancy is found, i.e. key extractor 130 detects that the key it produced is not correct, key extractor 130 may attempt to determine the cryptographic key using inverses from the multiple values.

It may happen that both tries do not give the correct cryptographic keys. That is, key extractor 130 is unable to determine the reproducible cryptographic key, neither with using the multiple values, nor with using the inverted multiple values. This may happen, e.g., in case of some unforeseen situation, e.g. an attack, malfunction etc. This embodiment has the advantage therefore that such situations are detected early. One particular situation, ageing of the PUF, is also detected in this way.

Below a specific example is given of a possible operation of address decoder 120.

Address decoder 120 maps logical addresses used by key extractor 130 into physical addresses on the multiple SRAM memories. When the key extractor is reading data from the SRAM memories, it may use bus ADB0 to indicate the addresses to be read out and retrieve the data. Preferably, the address decoder uses a secret mapping to distribute the logical addresses on bus ADB0 to physical memory addresses on buses ADB1, ADB2 and ADB3. For example, the key extractor may be reading a number of data bytes, say 256 data bytes, from memory addresses, say from memory addresses 0x0000 to 0x00FF on bus ADB0. Address decoder 120 distributes these memory addresses over the memory blocks as follows:

Addresses 0x0000 to 0x003F on bus ADB0 are connected to addresses 0x0000 to 0x003F on bus ADB1.
Addresses 0x0040 to 0x007F on bus ADB0 are connected to addresses 0x0000 to 0x003F on bus ADB2.
Addresses 0x0080 to 0x00BF on bus ADB0 are connected to addresses 0x0000 to 0x003F on bus ADB3.
Addresses 0x00C0 to 0x00FF on bus ADB0 are connected to addresses 0x0040 to 0x007F on bus ADB1.
. . . .

Note that a first range of the address used by key extractor 130, over bus ADB0, is mapped to memory 112. A second range of the address used by key extractor 130, over bus ADB0, is also mapped to memory 112. Between the first range and the second range there is at least one address used by key extractor 130, which is mapped to a different memory, in this case, memory 114 and 116.

Note that this is just an exemplary scheme and any kind of mapping is possible in principle. Preferably, the mapping in the address decoder is fixed, so that each time when the same memory addresses on bus ADB0 are read or written, this is mapped to the same memory addresses on one of the buses ADB1, ADB2, ADB3.

In a preferable embodiment according to the invention, the helper data construction means is coupled to an unlock means, and wherein the helper data construction means is arranged to produce helper data upon the unlock means receiving an unlock signal. The unlock means has independent merit, as it avoids an attack involving re-starting the helper constructor 150 after the enrollment phase is finished. An example of such an independent embodiment is as follows: An electronic system having a memory with multiple memory locations, each specific memory location of the multiple memory locations is arranged to produce a respective value, the respective value depending on a physical, at least partially random, configuration of components constructing the specific memory location, the electronic system comprises a key extraction means arranged to retrieve the multiple memory locations to obtain multiple values and for determining a reproducible cryptographic key in dependency on the multiple values, the electronic system comprises a helper data construction means, the helper data construction means being arranged to produce helper data in dependency on the multiple values and to store the helper data in helper data memory, and wherein the key extraction means is arranged to apply an error correcting procedure on the multiple values in dependency on the helper data for making the cryptographic key reproducible, and wherein the helper data construction means is coupled to an unlock means, and wherein the helper data construction means is arranged to produce helper data upon the unlock means receiving an unlock signal.

The unlock means may comprise an unlock memory on which is stored a password. The unlock signal comprises the password. When the unlock means receives the unlock signal, it unlocks the helper data constructor 150 and allows it to proceed with the production of helper data.

Alternatively, the unlock means uses a challenge response system. When so requested, the unlock means sends out a challenge. When it receives an unlock signal with the correct response, the unlock means unlocks the helper data constructor 150. For example, the challenge is a random number, and the corresponding response is the encryption of the challenge under a secret key which is stored in a memory of the unlock means. The unlock means may be combined with any one of the inventions disclosed herein.

As noted above, by distributing the multiple memory cells over an integrated circuit, it is more difficult for an attacker to localize from where the PUF data is generated. The distributing may be performed while generating the layout of the integrated circuited. From the layout, the integrated circuit may be manufactured. A layout for an integrated circuit may be created as follows.

Using a Hardware description language (HDL), such as VHDL or Verilog, a formal description of the electronic circuit is given. Using a synthesize tool a gate-level netlist is determined from the formal description. The netlist is processed by a placement and routing tool. The placing comprises placing the gates onto a region representing the final layout. The routing comprises determining electrical connections between placed gates, where needed. The placement and routing tool attempts to find a placement of the gates, subject to a variety of specified constraints.

There are several ways in which the layout for the integrated circuit can be obtained wherein the multiple memory cells are distributed across the integrated circuit. We will collectively refer to these methods as 'layout obfuscation' methods as they arrange or re-arrange a layout in order to make reverse engineering of the integrated circuit more difficult. It has been found that a particularly effective way of layout obfuscation is visual obfuscation of the layout. In visual obfuscation of the layout, the connections between gates are not altered, only the placing and routing of the gates is modified so that the multiple memory cells are distributed over the integrated circuit. It is also possible to do layout obfuscation using 'logical obfuscation' wherein the connections between gates may be altered, additional gates may be inserted, etc. For example, dummy gates which are not connected to the gates producing the logic of the integrated circuit may be inserted. Visual obfuscation may be combined with logical obfuscation. It has been found that on integrated circuits of even moderate complexity, visual obfuscation is already a significant impediment to reverse engineering.

The processing of the netlist with a placement and routing tool may be configured to distribute the multiple memory cells over the integrated circuit, in a number of ways. Some examples are given below.

During the synthesizing, the so-called 'flattening' option may be used instead of the so-called 'hierarchical' option. The flattening option causes the synthesis tool to optimize over module boundaries, while the hierarchical option causes it to keep the original hierarchy in place when producing the gate-level netlist. In this manner it is avoided that the multiple memory cells are placed close together in a single module.

Moreover, the synthesis tool can be instructed to avoid the use of so-called 'hard IP' bocks. A hard IP design is represented as a mask layout, so the placement and routing has already taken place. Using hard IP enables designers to efficiently build systems on chips (SOCs) with existing (typically complex) building blocks. It is observed that the use of hard IP make reverse engineering easier. First of all, for the individual gates in such IP blocks their relative placement is predetermined and may not be further obfuscated. Second, using visual inspection of a layout a standard hard IP block is easier to recognize since it is larger than its individual gates. Accordingly, a lower level of magnification is needed to reverse engineer the integrated circuit, at least up to the used hard IP blocks. Flattened synthesis does not work on hard-IP blocks since they have been pre-synthesized and appear as black boxes to the synthesis tool.

A third way for layout obfuscation is to configure the placement and routing tool to cause the gates to be spread over the integrated circuit and/or over the multiple metal layers. For example, the placement and routing tool may comprise an optimizer to optimize the layout for various objectives subject to the constraints imposed by the netlist. For example, an optimizer may have the objective to minimize the total length of electronic connections. The optimizer may be configured with an additional objective, namely, to optimize the distribution of the multiple memory cells so as to disperse them.

For example, one may identify multiple gates in the netlist corresponding to the multiple memory locations. The gates are identified such that the respective value that is produced by a memory location depends on the gate that is identified as corresponding to that memory location. In other words, in order to determine from a reverse engineering of the integrated circuit what value is produced by a particular memory location, one needs to reverse engineer at least the gate that is identified for that particular memory location. Preferably, different memory locations correspond to different gates. The identification may be performed on the basis of the formal description of the integrated circuit. For example, the synthesis tool may keep track of which gates are synthesized as a result of the instructions in the HDL description that specify the memory locations. Note that the synthesis tool may be instructed which memory locations are to be obfuscated. For example, the instructions related to the memory locations may be tagged. On the other hand, the synthesis tool itself may also use tagging to pass information to the placement and routing tool. For example, tag at least one important gate for each memory location so that the placement and routing tool has information on which gates are related to memory. An important gate is a gate on which the respective value of a specific memory location depends.

During an obfuscation step performed by the placement and routing tool the identified gates are distributed across the integrated circuit in a random manner. The obfuscation step breaks up the important gates. As a result, the location on the integrated circuit of the identified gates is unpredictable. The means that an attacker needs to reverse engineer a substantive part of the integrated circuit to locate gates, and to label them as such. That is, even though an attacker may know the location and type of all the gates on the integrated circuit it may still be unclear which gate is used for producing the cryptographic key. That is, in an obfuscated layout the function of gates does not directly follow from its location and/or type.

The layout obfuscation may also be applied to other components of the integrated circuit, e.g., to any one of the re-ordering means, key extraction means, helper data construction means, helper data memory, unlock means, construction signaling means, etc.

Note, one way to obfuscate the gates of the netlist responsible for producing the respective values of the multiple memory locations, is to obfuscate a substantial part of the gates regardless of their function, say a majority of the gates. In this manner, e.g., by chance, also a large part of the gates responsible for the functioning of the memory locations and the respective values produced by them are obfuscated.

It is also possible to identify the gates in the netlist which are important for the functioning of the memory locations. For example, the synthesizing and/or the processing may comprise identifying at least one gate in the gate-level netlist for each memory location of the multiple memory locations, producing the respective value by a specific memory location of the multiple memory locations depending on the identified gate corresponding to the specific memory location. Processing the netlist may comprise an obfuscation step wherein the identified gates are distributed randomly across the integrated circuit.

A random distribution of gates across the integrated circuit disperses the gates and for practical purposes breaks the correlation between the location on the integrated circuit of a gate and its function. In particular, gates having a similar function, e.g., two gates on which a value producible by a memory location depends may be placed apart from each other.

It should be noted that the above-mentioned embodiments illustrate rather than limit the invention, and that those skilled in the art will be able to design many alternative embodiments without departing from the scope of the appended claims. In the claims, any reference signs placed between parentheses shall not be construed as limiting the claim. Use of the verb "comprise" and "include" and its conjugations do not exclude the presence of elements or steps other than those stated in a claim. The article "a" or "an" preceding an element does not exclude the presence of a plurality of such elements. The invention may be implemented by means of hardware comprising several distinct elements, and by means of a suitably programmed computer. A computer program product may be stored/distributed on a suitable medium, such as optical storage, but may also be distributed in other forms, such as being distributed via the Internet or wired or wireless telecommunication systems. In a system/device/apparatus claim enumerating several means, several of these means may be embodied by one and the same item of hardware. The mere fact that certain measures are recited in mutually different dependent claims does not indicate that a combination of these measures cannot be used to advantage.

The invention claimed is:

1. An electronic system having a volatile memory with multiple memory locations, each specific memory location of the multiple memory locations being arranged to produce a respective value when powered up, the respective value depending on a physical, at least partially random, configuration of components constructing the specific memory location, wherein the electronic system comprises:
a key extraction means arranged to retrieve multiple values in a first order from the multiple memory locations and for determining a reproducible cryptographic key in dependency on the multiple values,
a re-ordering means in between the memory and the key extraction means for providing the multiple values to the key extraction means in a second order, different from the first order, prior to determining the cryptographic key, wherein
the memory comprises multiple separate memory blocks, and wherein the multiple memory locations are distributed over all the multiple memory blocks, the multiple separate memory blocks being distributed across an integrated circuit.

2. An electronic system as in claim 1, wherein at least one of the multiple separate memory blocks comprises precisely one memory location.

3. An electronic system as in claim 1, wherein the second order is arranged for permuting the multiple values across all the separate memory blocks.

4. An electronic system as in claim 1, wherein each specific memory location of the multiple memory locations is associated in the key extracting means with a specific one of multiple addresses, the key extracting means being configured to retrieve, for determining the reproducible cryptographic key, the multiple values from the multiple memory locations through respective read requests for the respective addresses, the re-ordering means is arranged with an address decoder for reading in response to a specific one of the multiple read requests from a different memory location than the specific memory location associated with the specific address.

5. An electronic system as in claim 1, wherein the electronic system comprises a helper data construction means, the helper data construction means being arranged to produce helper data in dependency on the multiple values and to store the helper data in helper data memory, and wherein the key extraction means is arranged to apply an error correcting procedure on the multiple values in dependency on the helper data for making the cryptographic key reproducible.

6. An electronic system as in claim 5, comprising an unlock means coupled to the helper data construction means, wherein the helper data construction means is arranged to produce helper data upon the unlock means receiving an unlock signal.

7. An electronic system as in claim 5, wherein the electronic system comprises a construction signaling means for signaling if the helper data has been created.

8. An electronic system as in claim 7, wherein the construction signaling means includes a construction signaling flag arranged for indicating if the helper data has been created.

9. An electronic system as in claim 7, wherein the construction signaling means comprises means for storing in the helper data memory a construction string which indicates that the helper data has been created.

10. An electronic system as in claim 1 wherein the memory is of a writable type and wherein the electronic system comprises an inversion means for writing to each of the specific memory locations an inverse of the specific value and inversion determination means for determining if the multiple memory locations store the inverse of the multiple values.

11. An electronic system as in claim 10, wherein the inversion determination means comprises an inversion signaling flag for signaling that the multiple memory locations stores the inverse of the multiple values.

12. An electronic system as in claim 10, wherein the electronic system comprises a helper data construction means, the helper data construction means being arranged to produce helper data in dependency on the multiple values and to store the helper data in helper data memory, and wherein the key extraction means is arranged to apply an error correcting procedure on the multiple values in dependency on the helper data for making the cryptographic key reproducible, and wherein the helper data construction means is further arranged for producing a verification string for indicating the correctness of the reproducible cryptographic key and storing the verification string in the helper data memory, wherein determining a reproducible cryptographic key in dependency on the multiple values selectably comprises inverting the multiple values, said selection depending on the verification string correctness indicating the correctness of the reproducible cryptographic key.

13. An electronic system as in claim 1, wherein the electronic system is embodied in an integrated circuit.

14. An electronic system as in claim 1, wherein the memory is a Static Random Access Memory (SRAM).

15. An electronic system as in claim 1, wherein the memory comprises flip-flops.

16. An electronic system as in claim 1, wherein at least one of the multiple memory blocks comprises a single flip-flop.

17. A method of determining a layout for an integrated circuit embodying an electronic system having a memory with multiple memory locations according to claim 1, the method comprising
synthesizing a formal description of the integrated circuit to obtain a gate-level netlist of the integrated circuit, and
processing the netlist with a placement and routing tool to obtain the layout, wherein
processing the netlist comprises an obfuscation step wherein gates of the gate-level netlist are distributed randomly across the integrated circuit, the distributed gates including at least gates on which the respective values producible by the multiple memory locations depend.

18. A method of determining a reproducible cryptographic key, comprising:
(a) retrieving multiple values from multiple memory locations in a volatile memory, each specific memory location of the multiple memory locations being arranged to produce a specific one of multiple values when powered up, the specific value depending on a specific physical, at least partially random, configuration of specific components constructing the specific memory location,
(b) determining a reproducible cryptographic key in dependency on the multiple values, and
(c) re-ordering the multiple values prior to determining the cryptographic key.

19. A method of determining a reproducible cryptographic key as in claim 18, comprising
constructing helper data in dependency on the multiple values,
storing the helper data in a helper data memory, and
signaling that the helper data has been created, wherein
determining the reproducible cryptographic key comprises applying an error correcting procedure on the multiple values in dependency on the helper data for making the cryptographic key reproducible.

20. A method of determining a reproducible cryptographic key as in claim 18, comprising
writing to each of the specific memory locations an inverse of the specific value, and
determining if the multiple memory location store the inverse of the multiple values, wherein
the determining of the reproducible key comprises inverting the multiple values in dependency on the determining if the multiple memory location store the inverse of the multiple values.

21. A computer program comprising computer program code means adapted to perform all the steps of claim 17 when the computer program is run on a computer.

22. A computer program comprising computer program code means adapted to perform all the steps of claim 18 when the computer program is run on a computer.

* * * * *